Feb. 14, 1967    G. SAUSSELE    3,304,481
CIRCUIT FOR DIRECT CURRENT MINIATURE MOTORS
WITHOUT MECHANICAL COMMUTATORS
Filed July 29, 1964    2 Sheets-Sheet 1

United States Patent Office 3,304,481
Patented Feb. 14, 1967

3,304,481
CIRCUIT FOR DIRECT CURRENT MINIATURE MOTORS WITHOUT MECHANICAL COMMUTATORS
Günter Saussele, Nurnberg, Germany, assignor to Siemens-Schuckertwerke Aktiengesellschaft, Berlin-Siemensstadt, Germany, a corporation of Germany
Filed July 29, 1964, Ser. No. 385,900
Claims priority, application Germany, Aug. 2, 1963, S 86,507
5 Claims. (Cl. 318—138)

My invention relates to direct-current fractional horsepower or midget motors with permanent-magnet rotors and star-connected stator windings which operate with the aid of electronic commutating circuit rather than with a mechanical commutator.

The mechanical commutators with which conventional direct-current motors are equipped fail to properly operate at high speeds of rotation. Various proposals have become known to substitute mechanical commutating devices with circuits operating without the aid of mechanical switches and in effect, in conjunction with electronic amplifiers, achieve the commutation of the currents supplied to the motor for producing the rotating magnetic field. Coil arrangements or Hall-generator devices have been known, for the purpose of controlling such non-mechanical commutating circuits in response to the rotation of a permanent-magnet rotor or in response to an auxiliary magnet additionally mounted on the rotor shaft.

It is an object of my invention to provide for commutation in direct-current motors, particularly those of the midget type, that is capable of securing a reliable performance at any operating speed without the necessity of providing the motor with additional pulse or signal transmitters such as the above-mentioned Hall generators or auxiliary magnets.

I have discovered that such a commutation by electronic means and with the aid of a rotating or other mechanical commutator is readily attainable in direct-current motors, preferably midget motors, having permanent-magnet rotors and star-connected stator windings by controlling the commutation of the stator currents in dependence upon the voltages which the rotor induces in these stator windings during the intervals in which no energizing current is supplied to the individual windings.

According to another feature of the invention, the outer terminals of each of two sequentially adjacent stator windings, i.e. the winding ends that are not connected with the star point of the energizing circuit, are connected with the inputs of an electronic pulse generator or transmitter. This electronic pulse transmitter converts the alternating voltages induced in the stator windings to a positive and negative control pulse depending upon the direction of rotor rotation. This control pulse is employed for switching off the current of the stator winding energized at the time and for switching on the current of the sequentially next following stator winding. For this purpose, and in accordance with another, preferred feature of my invention, the control pulses from the pulse transmitter are supplied to the set and reset inputs of respective bistable flip-flop stages which in turn control the supply of current to the respective stator windings.

The electronic pulse transmitter preferably comprises two transistors which are interconnected in such a manner that a differentiating member, connected to the output of the flip-flop, furnishes a positive or negative pulse, depending upon the direction of rotor rotation, as soon as the two half waves of the respective voltages induced in the above-mentioned two sequential stator windings intersect each other, these half waves having a polarity opposed to that of the feeder voltage which energizes the motor.

The invention will be further described with reference to an embodiment of the motor circuit according to the invention schematically illustrated by way of example on the accompanying drawings in which.

Figure 1:
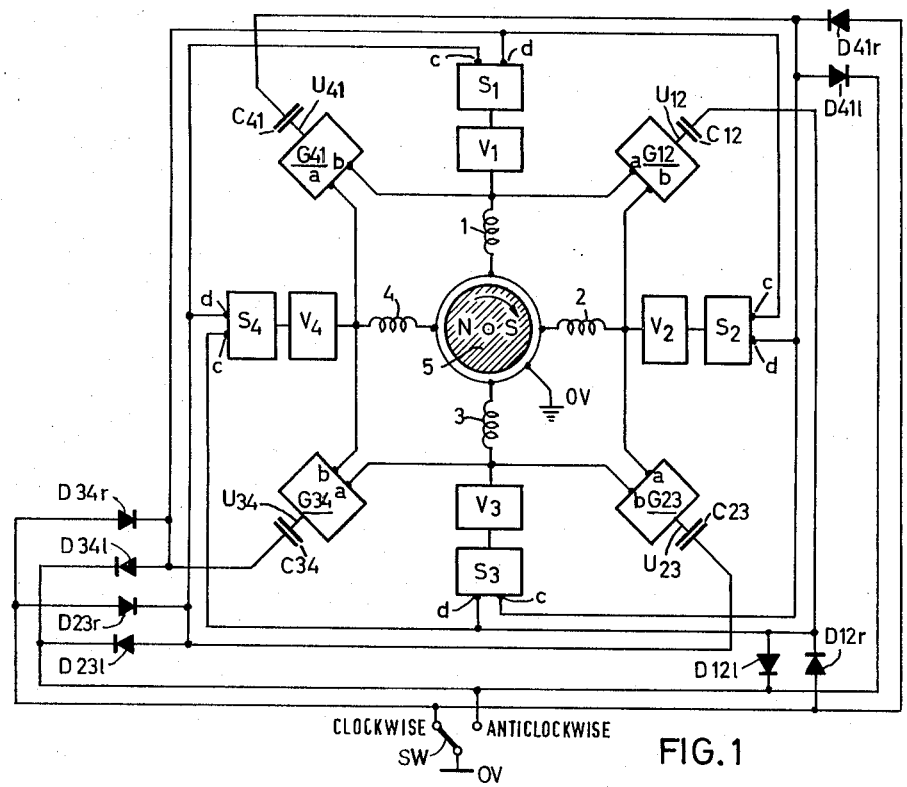
FIG. 1 is a block diagram of the complete circuit comprising a commutatorless direct-current midget motor.
Figures 3, 4:
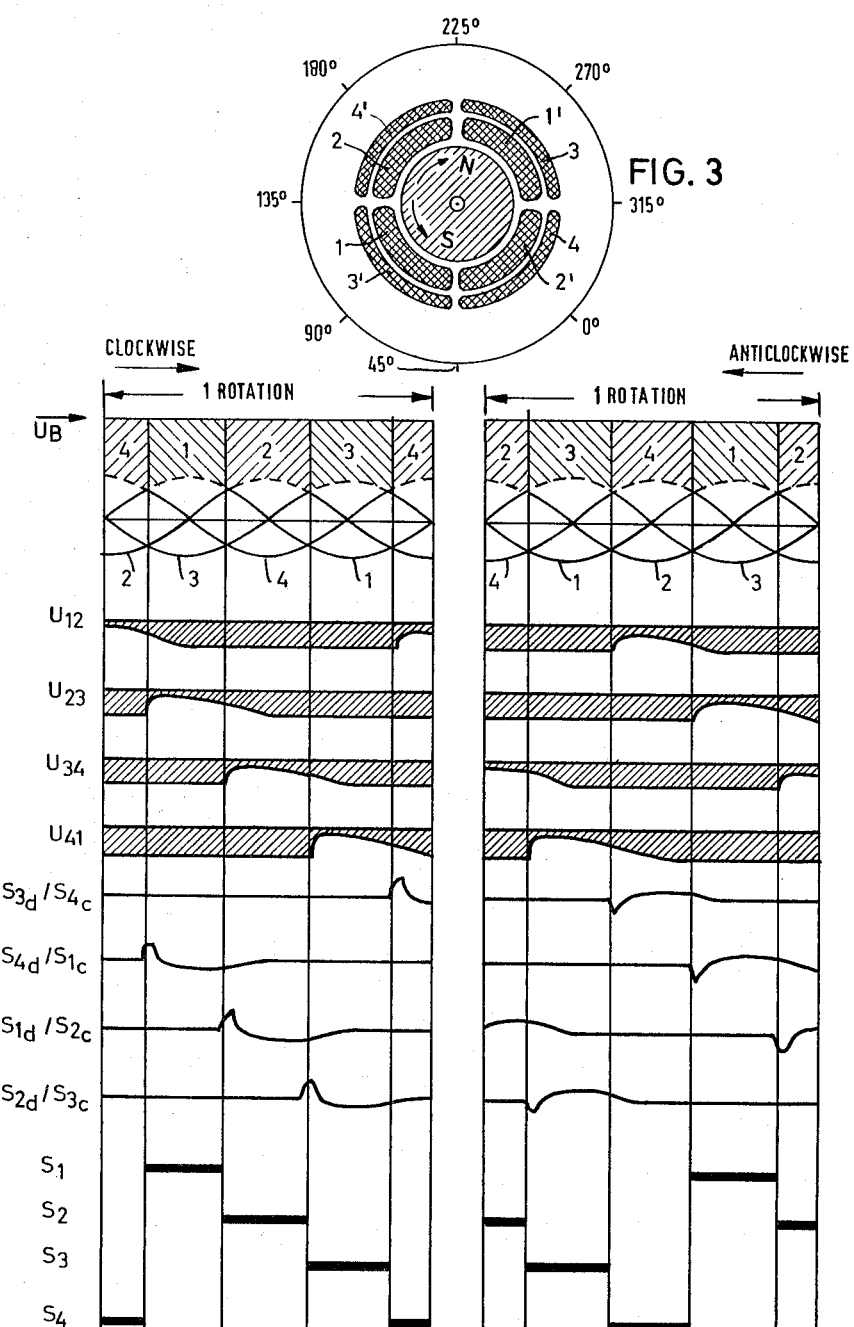

FIG. 3 shows schematically the arrangement of the stator windings in the motor according to FIG. 1; and FIG. 4 is a graphic representation of the voltages induced in the stator windings, the voltages appearing at the output of the pulse transmitters, and the conditions of the bistable flip-flop stages which control the stator currents, each of the individual diagrams being plotted versus the rotor position within a single full rotation of the rotor.

The illustrated electronic commutating circuit relates to a direct-current midget-type motor for high speed of rotation which is equipped with a permanent magnet rotor and the four star-point connected stator windings.

The windings, denoted by 1, 2, 3 and 4, are spacially displaced 90° from each other and have one of the respective ends connected with each other so as to form a star-point connection. The spacial arrangement of the windings is apparent from FIG. 3 in schematical representation in which appertaining winding portions are denoted by 1 and 1', 2 and 2', 3 and 3', 4 and 4'. Each two winding portions constitute a single one of the windings simply denoted in FIG. 1 by 1, 2, 3 and 4 respectively. The permanent magnet rotor 5 has two magnet poles in diametrical magnetization, the poles being indicated at N and S.

The other ends of the windings 1 to 4 are pairwise connected to the inputs $a$ and $b$ of pulse transmitters $G_{12}$, $G_{23}$, $G_{34}$ and $G_{41}$. One of these pulse transmitters is separately shown in FIG. 2 where it is denoted by G, it being understood that all four transmitters are designed and operative in the same manner. The output of each pulse transmitter is connected through a capacitor $C_{12}$, $C_{23}$, $C_{34}$ or $C_{41}$ with the set and reset inputs of four flip-flops $S_1$, $S_2$, $S_3$, and $S_4$. The output of each flip-flop controls an amplifier $V_1$, $V_2$, $V_3$ or $V_4$ which, when turned on by the appertaining one flip-flop, passes direct current from a direct-current supply to the one stator winding connected to the amplifier.

Figure 2:
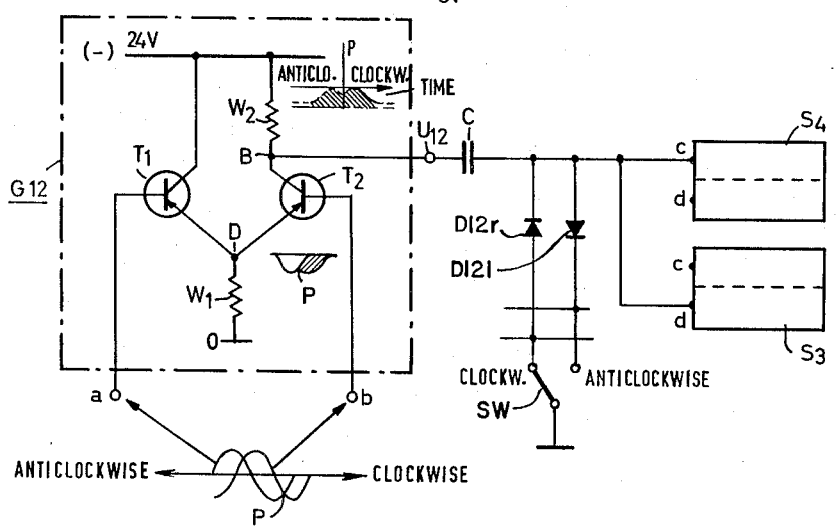
FIG. 2 shows the circuit diagram of one of four pulse transmitters and associated circuit components that form part of the circuit according to FIG. 2.

In FIG. 2 one of the flip-flops is denoted by S. It will be seen that the capacitor, denoted by C in FIG. 2, together with an input resistor R of the set input constitutes a differentiating member. With the aid of the differentiating member the pulse transmitter G furnishes to the flip-flop either a positive or a negative pulse depending upon the rotational direction of the rotor, as will be further explained below. Pairs of opposingly poled diodes D12r and D12l, D23r and D23l, D34r and D34l, D41r and D41l are provided in order to permit only the pulses of the proper polarity to act upon the respective flip-flops, depending upon the direction of rotation. Only one diode of each pair is selected for operation at a time, by means of a selector switch SW which is set by the starter of the motor. Thus, according to FIG. 12, the diode D12r short-circuits the negative pulses for clockwise rotation, and the diode D12l shorts the positive pulses for anticlockwise rotation of the motor.

As shown in FIG. 1, the output of each pulse transmitter is connected with the set input $c$ of one flip-flop and with the reset input $d$ of another input. For example, the pulse transmitter $G_{34}$ is connected through the capacitor $C_{34}$ with the set input $c$ of flip-flop $S_2$ which controls through amplifier $V_2$ the flow of current through the stator winding 2, and the same pulse-transmitter output is connected to the reset input $d$ of the next preceding flip-flop $S_1$ which controls the amplifier $V_1$ supplying current to the stator winding 1. Consequently, the circuit connections are such that when a pulse is issued from any one of the pulse transmitters, the flip-flop, acting as a bistable storer or memory which then is active to permit the passage of current through one of the field windings, such as the flip-flop $S_1$ which then controls current to energize the stator winding 1, is reset and thus discontinues the current flow, whereas simultaneously the sequentially mixed flip-flop storer $S_2$ is set and causes current to commence flowing through the next sequential stator winding 2. The pulse transmitters $G_{12}$, $G_{23}$, $G_{34}$ and $G_{41}$ thus serve the purpose of controlling the stator currrents through the bistable flip-flop stages $S_1$ to $S_4$ and the amplifiers $V_1$ to $V_4$ in the desired commutating sense, thereby maintaining the rotor 5 in rotation by virtue of the rotating magnetic field produced by the intermittent and sequential energization of the stator coils. It will further be recognized, that each individual stator coil is energized for a certain interval of time, and remains deenergized between the active intervals. During the inactive intervals, alternating voltages are induced in the stator windings on account of the rotation of the permanent-magnet rotor 5.

The operation of the pulse transmitters will be further explained with reference to the transmitter G shown in FIG. 2. Each transmitter comprises two transistors $T_1$ and $T_2$. The emitters of the transistor are connected with each other at point D which is connected through a common emitter resistor $W_1$ to ground or zero potential O. The collector circuit of transistor $T_2$ contains a resistor $W_2$. The base-connected inputs $a$ and $b$ are connected with the respective ends of two sequentially adjacent stator windings as described above with reference to FIG. 1. The alternating voltage induced during the inactive intervals in the stator windings is sinusoidal and is 90° phase displaced from one winding to the next. These sinusoidal voltages are schematically shown in the top portion of FIG. 4 where they are denoted by the same reference numerals as the respective stator windings in which the voltages are induced. The induced voltages are pairwise impressed upon the inputs $a$ and $b$ of the pulse transmitters. The same voltages are also shown in the bottom portion of FIG. 2 and respective arrows are added to show which voltage is impressed upon input $a$ and input $b$ respectively. As long as the two voltages are positive, the two transistors $T_1$ and $T_2$ are turned off so that the point D in the collector circuit of transistor $T_2$ has a negative potential. When now the voltage at input $a$ becomes negative, the transistor $T_1$ is turned on increasingly with increasing negative potential. This makes the common emitter point D more and more negative, this being shown by the schematic voltage diagram entered at the right of point D in FIG. 2. As a result, the transistor $T_2$ remains turned off until the voltage at input $b$ becomes negative relative to the voltage at point D. This occurs when the two negative half waves intersect. The time-point of intersection is denoted in FIG. 2 by P.

At this moment P, the voltage at circuit point B decreases down to zero, this is shown schematically in the voltage diagram in the top portion of FIG. 2 at the right of the resistor $W_2$. In the latter voltage diagram the period of the voltage decline is hatched, whereas in the voltage diagram next to point D the conducting period of the transistor $T_2$ is hatched. Due to the differentiating member composed of the capacitor C and the input resistor R of the flip-flop storer S, the decline in voltage is differentiated so that the input $c$ of the storer S receives a peaked or needle shaped positive pulse.

When the rotor rotates in the reverse, i.e. anti-clockwise direction, a negative pulse is produced analogously. This case is represented in FIG. 2 by the voltage curves shown by broken lines.

If the motor is to be energized by negative voltage, then the pulses must be formed from the intersection points of the positive half waves of the induced counter voltage. In the latter case the transistors $T_1$ and $T_2$ must be of the n-p-n type (instead of the p-n-p type assumed in the foregoing). This pulse transmitter operates in the same manner as the one described above, except that all voltages and currents are in the opposed directions.

In FIG. 4, the voltage conditions shown in the left-hand portion of the diagram relate to rotation in the clockwise direction, and those shown in the right-hand portion to rotation in the counterclockwise sense. The voltages occurring at the outputs of the respective pulse transmitters $G_{12}$, $G_{23}$, $G_{34}$ and $G_{41}$ are denoted by $U_{12}$, $U_{23}$, $U_{34}$ and $U_{41}$ respectively. The four following lines $S3_d/S4_c$; $S4_d/S1_c$; $S1_d/S2_c$; $S2_d/S3_c$ in the diagram represent the voltage pulses which, upon differentiation of the voltage changes, are supplied to the inputs $c$ and $d$ of the flip-flop storers S. The next four lines S1, S2, S3, S4 represent by heavy bars the duration of the stable condition set in the storers $S_1$ to $S_4$ during which the respective stator windings 1 to 4 are energized by direct current. The diagram of FIG. 4 thus indicates which particular pulse transmitter must operate to set or reset each of the respective four storers so that the amplifiers $V_1$ to $V_4$ connect the stator windings 1 to 4 to the feed voltage $U_B$ in the manner required for continuing the rotation of the rotor 5 in the existing direction of rotation.

It will be understood that the particular motor shown is not self-starting. Consequently when energizing it from stand-still it must first be rotated by any of the known and available electrical or mechanical starting devices to the speed in which the voltages induced by the rotating rotor in the stator windings become sufficient for producing the above-described control signals. Since such starting devices are well known and not part of the invention proper, they are not illustrated and described herein.

To those skilled in the art, it will be obvious from a study of this disclosure that with respect to circuitry and circuit components my invention permits of a great variety of modifications and hence can be given embodiments other than particularly illustrated and described herein, without departing from the essential features of my invention and within the scope of the claims annexed hereto.

I claim:

1. An electric motor circuit comprising a direct-current miniature motor without mechanical commutators, said motor having a permanent-magnet rotor and star-connected stator windings, direct-current circuit means connected to said respective windings for sequentially energizing them by direct current to produce a rotating magnetic field, said circuit means comprising current control means responsive to voltage induced by said rotor in said stator windings during respective intervals between said energizing currents, whereby the energizing currents of said respective stator windings are commutated under control by said induced voltages.

2. An electric motor circuit, comprising a commutator-less direct-current motor having a permanent-magnet rotor and stator winding with respective ends in star-point connection, direct-current supply means connected between the star point and the respective other ends of said windings, electronic sequencing switch means interposed between said current supply means and said respective other winding ends for sequentially energizing said windings by direct current, and control means connected with said switch means and responsive to voltage induced by said rotor in said respective stator windings between the energizing intervals, whereby the energizing currents of said respective stator windings are commutated, under control, by said induced voltages.

3. An electric motor circuit, comprising a commutatorless direct-current motor having a permanent-magnet rotor and stator windings with respective ends in starpoint connection, direct-current supply means connected between the star point and the respective other ends of said windings, respective flip-flops interposed between said other winding ends and said supply means for passing direct current to each of said stator windings during an energizing interval in which the appertaining one of said flip-flops is in a given switching condition, and electronic switching pulse transmitters connected between said other ends of each two immediately successive ones of said stator windings so as to be responsive to voltage induced by said rotor in said windings, said transmitters having respective outputs connected to said flip-flops for controlling said flip-flops to sequentially energize said stator windings under commutation control by said induced voltages.

4. An electric motor circuit, comprising a commutatorless direct-current motor having a permanent-magnet rotor and stator windings with respective ends in star-point connection, direct-current supply means connected between the star point and the respective other ends of said windings, respective bistable flip-flops interposed between said other winding ends and said supply means for passing direct current to each of said stator windings during an energizing interval in which the appertaining one of said flip-flops is in one of its stable conditions, electronic switching pulse transmitters connected between said other ends of each two immediately successive ones of said stator windings so as to be responsive to alternating currents induced by said rotor in said two windings and having an output for providing respective positive and negative control pulses depending upon the rotational direction of said rotor, each of said flip-flops having a set input and a reset input connected to the respective outputs of two of said pulse transmitters, whereby each of said pulses causes one of said flip-flops to switch off the current of one of said stator windings and to switch on the current for the next sequential stator winding.

5. In an elecric motor circuit according to claim 4, each of said pulse transmitters comprising two transistors having a common emitter circuit and having respective base leads connected to said other ends of said two stator windings for controlling one of said transistors to conduct at the moment when the two alternating voltages induced in said respective two windings have equal amplitudes, said transmitter output having a signal lead joined with the collector side of said one transistor and comprising differentiating means for issuing a control pulse to said flip-flops.

No references cited.

ORIS L. RADER, *Primary Examiner.*

G. SIMMONS, *Assistant Examiner.*